Patented June 6, 1939

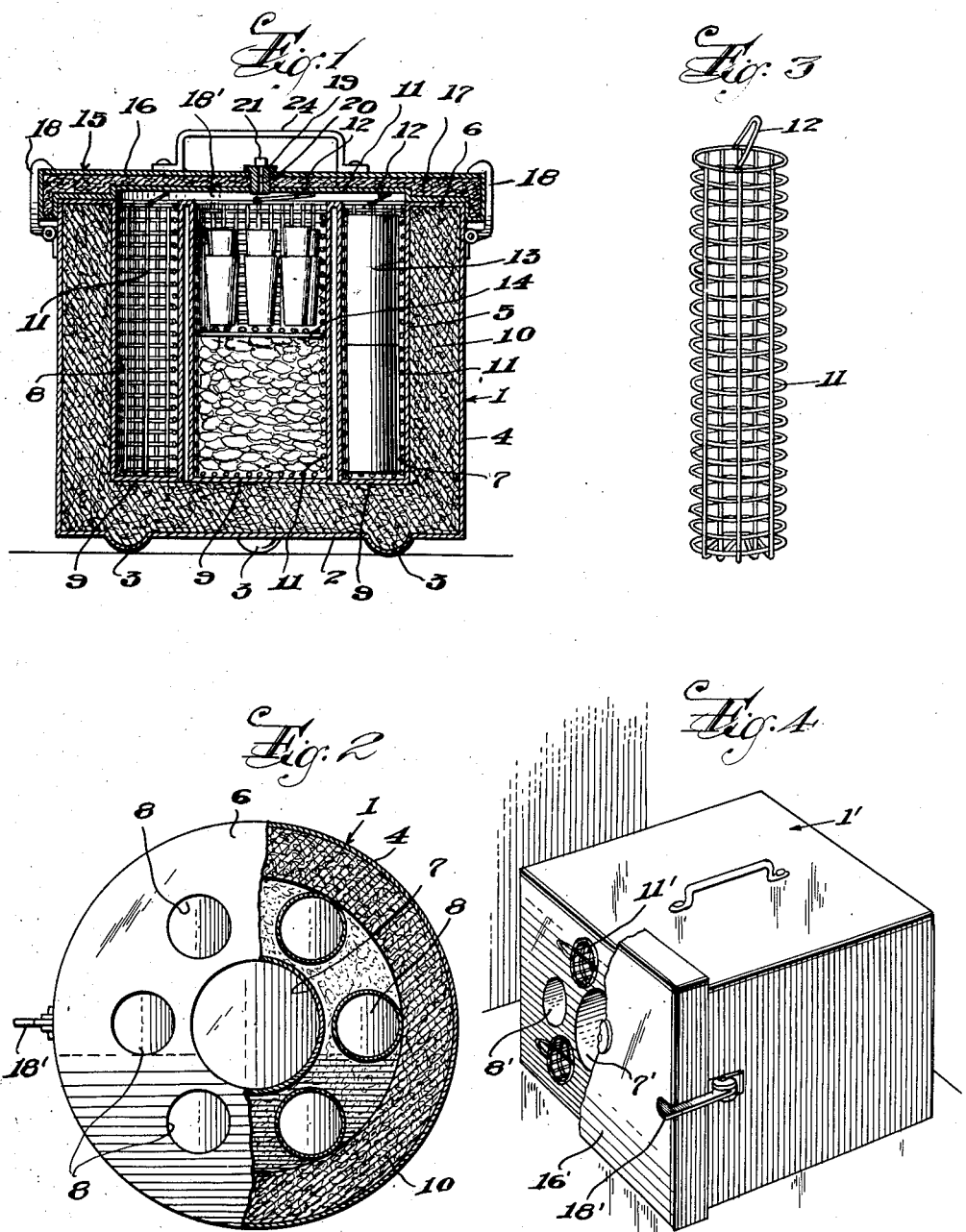

2,161,295

UNITED STATES PATENT OFFICE 2,161,295

CONTAINER

Charles A. Hirschberg, Mountain Lakes, N. J.

Application September 5, 1936, Serial No. 99,659

1 Claim. (Cl. 220—16)

This invention relates to containers, and more particularly to a portable insulated container particularly adapted for transportation of various beverages in cans, such as beer, fruit or vegetable juices or the like.

An object of the present invention is to provide a container as specified for use in taking beer in cans, or similar beverages, on outings, which container may be easily carried and will either maintain a quantity of cans of beverage cold for a protracted period, or may be used for the chilling of the beverage.

Another object of the present invention is to provide in a container as specified, removable baskets or containers for the cans, which baskets may be easily removed from the main container; and also to provide a basket or container which may be used for ice, "dry ice", or other suitable refrigerant, or for carrying glasses or other desired objects, or both.

With these and other objects in view, as may appear from the accompanying specification, the invention consists of various features of construction and combination of parts, which will be first described in connection with the accompanying drawing, showing a container of the preferred form embodying the invention, and the features forming the invention will be specifically pointed out in the claim.

In the drawing:

Figure 1 is a vertical section through the improved container.

Figure 2 is a view partly in top plan of the container with the cover removed and partly in horizontal section.

Figure 3 is a perspective view of one of the removable containers.

Figure 4 is a perspective view with parts broken away of a modified form of the invention.

Referring more particularly to the drawing, the improved container comprises a main body 1 which in the preferred form shown in Figures 1 and 2 of the drawing is cylindrical in shape, but it may be made in any shape desired without departing from the spirit of the present invention.

The bottom 2 of the body 1 of the container has outstruck portions 3 thereon forming supporting feet for supporting the bottom of the container above the surface on which the container rests.

The body 1 of the container is made preferably of sheet metal, and it comprises the outer wall 4 and the inner wall 5 which are sealed at the top of the container by the horizontal wall 6.

The sheet metal of which the body 1 is formed is shaped to provide a central well 7 and a plurality of wells 8 which are preferably smaller in diameter and are arranged about the central well 7. The bottoms 9 of the wells are formed integrally with or connected to their sides and consequently with the sheet metal of which the container body is formed in such manner as to provide an airtight space between the inner and outer walls of the main body 1 of the container. In Figures 1 and 2 of the drawing, the space about the outermost portions of the wells 8 and the space at the bottom of the wells is shown filled with a suitable insulating material indicated at 10, with the space between the wells 8 and the well 7 being free from insulating so as to permit cooling of the contents of the wells 8 from a suitable refrigerant which may be placed in the well 7. However, while Figures 1 and 2 show the insulating 10 in the space in the main body of the container, it is to be understood that this space may have the air extracted therefrom to form a vacuum in the space between the inner and outer walls of the body 1 of the container for the purpose of maintaining the interior temperature of the wells and the contents thereof for a protracted period of time.

All of the wells 7 and 8 have removable baskets or containers 11 inserted therein, and as shown in Figure 3 of the drawing. The removable containers 11 are preferably formed of mesh construction and they have bails 12 on their upper open ends to facilitate their removal from the respective wells. The removable containers 11 which fit in the wells 8 are of such diameter and depth as to receive snugly therein two cans of beer, one upon the other, as indicated at 13 in Figure 1 of the drawing. Thus with a container having six of the outer wells 8 therein, twelve cans of beer or analogous beverages can be contained in the container.

The central well 7 is of the same depth as the outer wells 8, but is larger in diameter, and it also has a mesh or foraminous basket 11 therein. The central well 7 may be used for containing glasses or any other suitable objects if desired, or it may be partially filled with a refrigerant, such as ice, "dry ice", or the like. A horizontal partition 14 is provided so that the bottom portion of the removable container 11 in the well 7 may be chilled with the refrigerant and the upper portion thereof used for containing glasses or other suitable objects.

A removable cover 15 is provided which cover comprises spaced walls 16 with the space 17 therebetween either filled with insulation or provided as a vacuum space for insulating purposes.

The cover 16 fits tightly against the upper end 6 of the body 1 of the container and is clamped thereon by suitable removable clamps 18. If it is so desired, the cover 16 may have a recess 18' at its inner surface which provides a circulating space establishing communication between the central well 7 and the plurality of wells 8 so as to allow cooling of the cans in the wells 8.

The cover 16 also has a vent nipple 19 therein which has a vent opening 20 therethrough opening into the central well 7, so that in case "dry ice" is used as a refrigerant an air circulation will be provided to permit the evaporation of the "dry ice" for the purpose of cooling the interior of the container. A suitable plug 21 may be provided for plugging the vent opening 20 when the container is used without "dry ice".

In use, the cans of beer or other beverages are placed in the removable containers or baskets 11 in the wells 8, and if these cans of beverages are sufficiently cold when placed in the removable container and no refrigerant is needed, the cover 16 is tightly clamped on the top of the container body 1 and due to the insulating properties of the container, the beer will be kept cold for a protracted period of time. When it is desired to remove the cans from the container, they may be easily and conveniently removed two at a time by removing the removable baskets or containers 11 from the respective wells. The large central well 7 may be used as heretofore stated, either as a container for a suitable refrigerant, or as a container for glasses or other objects. When "dry ice" or other similar refrigerant requiring air circulation is used in the central well 7, the plug 21 is removed for permitting such air circulation, and in such cases, the beer or other beverage in the cans in the wells 8 will be cooled by the refrigerating action of the refrigerant in the central well 7.

In Figure 4 of the drawing, a slight modification of the invention is shown. In this form, the container body 1' is shown as rectangular in shape, and it has a central well 7' and the plurality of smaller outer wells 8'. These wells open out at one end of the container 1' instead of through the top of the container. A removable cover 16' is provided which is tightly clamped on the end of the container 1' by suitable clamps 18'. Removable containers or baskets 11' are provided for the wells. In all other respects, the modified form of the container shown in Figure 4 is the same as the preferred form shown in Figures 1 to 3 inclusive.

A suitable handle 24 is provided for carrying the container.

It will be understood that the invention is not to be limited to the specific construction or arrangement of parts shown but that they may be widely modified within the invention defined by the claim.

What is claimed is:

In a container, an insulated body having a closed flush top and a relatively large central well and a plurality of smaller wells about said central well all formed by depressions in the top, said wells extending from the interior of the bottom of the body to the flush top, a removable closed insulated cover for the body fitting flush with the top of the body and having sealing flanges about its edges for sealing engagement with the sides of the body, means for clamping said cover on said body, said cover having a recess in its inner surface establishing communication between said wells, a vent opening in the cover and opening into said recess, a removable refrigerant receiving foraminous container in said central well, and a removable partition in said foraminous container for positioning above refrigerant therein to form a receptacle receiving compartment in the central well above the refrigerant.

CHARLES A. HIRSCHBERG.